(12) United States Patent
Aguilar et al.

(10) Patent No.: US 11,992,794 B2
(45) Date of Patent: May 28, 2024

(54) METHODS OF PLUGGING HONEYCOMB BODIES

(71) Applicant: CORNING INCORPORATED, Corning, NY (US)

(72) Inventors: Alejandro Aguilar, Painted Post, NY (US); Richard Dominic Bomba, Horseheads, NY (US); Kevin Eugene Elliott, Horseheads, NY (US); Christopher Lane Kerr, Tioga, PA (US); Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 723 days.

(21) Appl. No.: 17/257,400

(22) PCT Filed: Jun. 26, 2019

(86) PCT No.: PCT/US2019/039163
§ 371 (c)(1),
(2) Date: Dec. 31, 2020

(87) PCT Pub. No.: WO2020/009851
PCT Pub. Date: Jan. 9, 2020

(65) Prior Publication Data
US 2021/0268418 A1    Sep. 2, 2021

Related U.S. Application Data

(60) Provisional application No. 62/693,658, filed on Jul. 3, 2018.

(51) Int. Cl.
| B01D 46/00 | (2022.01) |
| B01D 46/24 | (2006.01) |
| B28B 11/00 | (2006.01) |

(52) U.S. Cl.
CPC ..... *B01D 46/0001* (2013.01); *B01D 46/2459* (2013.01); *B28B 11/007* (2013.01)

(58) Field of Classification Search
None
See application file for complete search history.

(56) References Cited

U.S. PATENT DOCUMENTS

| 4,403,008 A | 9/1983 | Factor |
| 4,411,856 A | 10/1983 | Montierth |
| (Continued) | | |

FOREIGN PATENT DOCUMENTS

| DE | 102012108698 A1 | 8/2013 |
| EP | 0260674 A2 | 3/1988 |
| (Continued) | | |

OTHER PUBLICATIONS

International Search Report and Written Opinion of the International Searching Authority; PCT/US19/39163; dated Nov. 7, 2019; 11 Pages; European Patent Office.

*Primary Examiner* — Michael P. Rodriguez
(74) *Attorney, Agent, or Firm* — Russell S. Magaziner

(57) ABSTRACT

A method of plugging a honeycomb body is disclosed herein, the method comprising: applying a mask layer to a honeycomb body comprising a plurality of channels; forming a plurality of holes in the mask layer such that the plurality of holes are aligned with the plurality of channels; positioning a nozzle defining an opening proximate the mask layer; moving at least one of the nozzle and the honeycomb body relative to one another; and passing a plugging cement through the opening defined by the nozzle against the mask layer such that the plugging cement passes through the plurality of holes in the mask layer and enters the plurality of channels of the honeycomb body.

20 Claims, 7 Drawing Sheets

(56) References Cited

U.S. PATENT DOCUMENTS

| | | | |
|---|---|---|---|
| 4,428,758 | A | 1/1984 | Montierth |
| 7,104,778 | B2 | 9/2006 | Bomba |
| 2007/0114700 | A1 | 5/2007 | Andrewlavage et al. |
| 2008/0128082 | A1* | 6/2008 | Masuda ............. B01D 46/2418 156/293 |
| 2009/0181167 | A1 | 7/2009 | Kimura et al. |
| 2009/0246458 | A1* | 10/2009 | Yamada ............... B01D 46/249 428/116 |
| 2016/0016185 | A1* | 1/2016 | Park ..................... B05C 5/0254 438/26 |

FOREIGN PATENT DOCUMENTS

| | | |
|---|---|---|
| EP | 1911570 A2 | 4/2008 |
| EP | 1964656 A2 | 9/2008 |
| EP | 2105185 A2 | 9/2009 |
| JP | 2006-015235 A | 1/2006 |
| KR | 10-2015-0143070 A | 12/2015 |

* cited by examiner

METHODS OF PLUGGING HONEYCOMB BODIES

This is a national stage application under 35 U.S.C. § 371 of International Application No. PCT/US2019/039163, filed Jun. 26, 2019, which claims the benefit of priority under 35 U.S.C. § 119 of U.S. Provisional Application Ser. No. 62/693,658 filed on Jul. 3, 2018, which is incorporated herein by reference in its entirety.

FIELD OF THE DISCLOSURE

The present disclosure generally relates to ceramic honeycomb bodies used as filters, and more specifically, to methods of plugging honeycomb bodies.

BACKGROUND

Ceramic wall flow filters typically have porous honeycomb structures with the plugs sealing alternate channels, which force exhaust gas flow through porous channel walls to exit from adjoining channels.

SUMMARY OF THE DISCLOSURE

A method of plugging a honeycomb body is disclosed herein, the method comprising: applying a mask layer to a honeycomb body comprising a plurality of channels; forming a plurality of holes in the mask layer such that the plurality of holes are aligned with the plurality of channels; positioning a nozzle defining an opening proximate the mask layer; moving at least one of the nozzle and the honeycomb body relative to one another; and passing a plugging cement through the opening defined by the nozzle against the mask layer such that the plugging cement passes through the plurality of holes in the mask layer and enters the plurality of channels of the honeycomb body.

Also disclosed herein is a method of plugging a honeycomb body, the method comprising: applying a mask layer to a honeycomb body comprising a plurality of channels; forming a plurality of holes in the mask layer such that the plurality of holes are aligned with the plurality of channels; positioning a nozzle defining a slot die opening proximate the mask layer to form a gap between the mask layer and the slot die opening; moving the honeycomb body relative to the nozzle; and passing a plugging cement through the slot die opening defined by the nozzle against the mask layer such that the plugging cement passes through the plurality of holes of the mask layer and enters the plurality of channels of the honeycomb body.

Also disclosed herein is a method of plugging a honeycomb body, the method comprising: applying a mask layer to a honeycomb body comprising a plurality of channels; forming a plurality of holes in the mask layer such that the holes are aligned with the plurality of channels; positioning a nozzle defining a slot die opening proximate the mask layer to form a gap of from about 0.1 mm to about 2 mm between the mask layer and the slot die opening, wherein the nozzle has an angle of from about 0° to about 20° relative to the mask layer and the slot die opening extends across a majority of a maximum width of the mask layer; moving the honeycomb body relative to the nozzle; and passing a plugging cement through the slot die opening defined by the nozzle against the mask layer such that the plugging cement passes through the plurality of holes in the mask layer and enters the plurality of channels of the honeycomb body.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
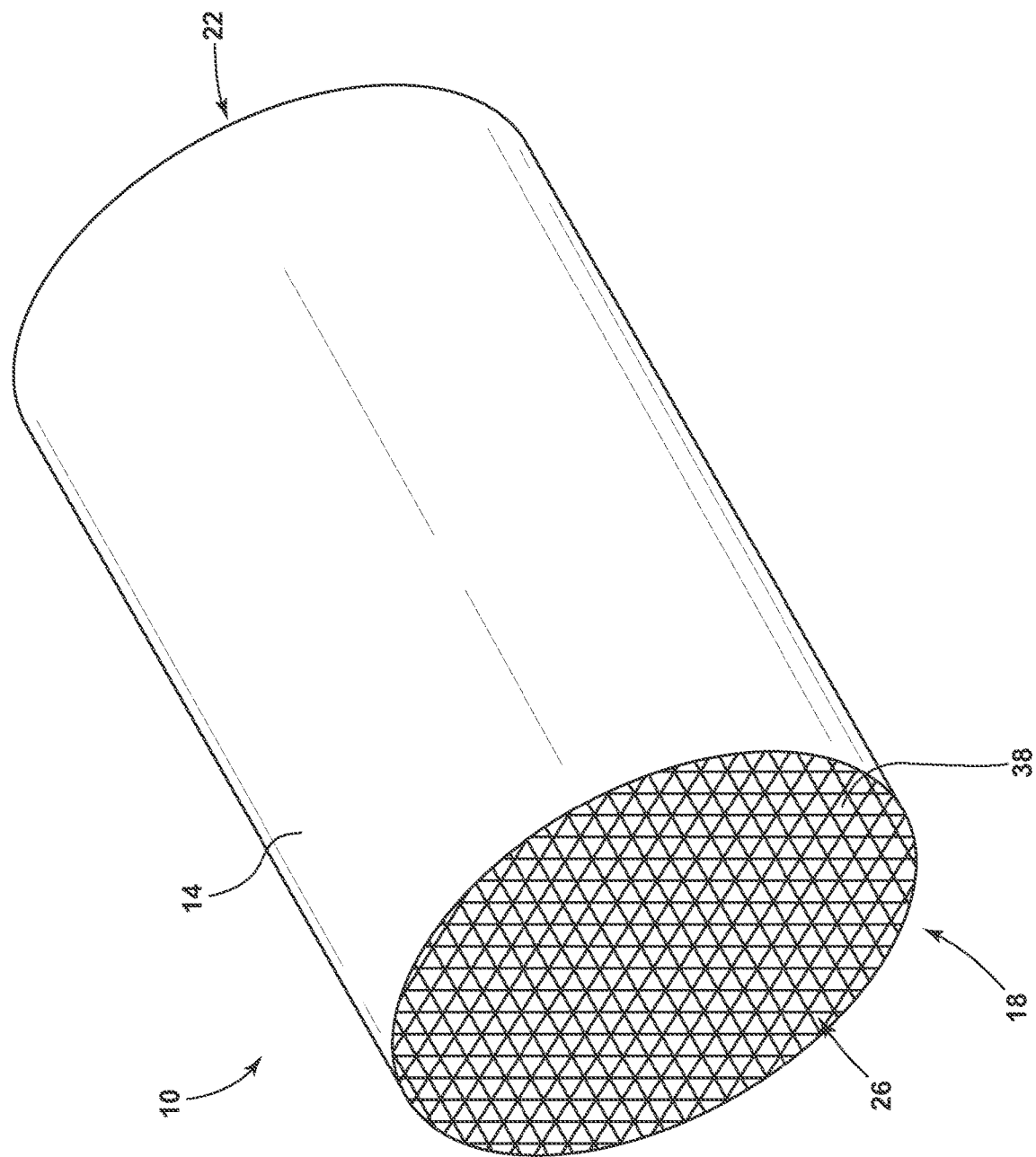
FIG. 1 is a perspective view of a filter, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The construction and arrangement of the elements of the present disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 2:
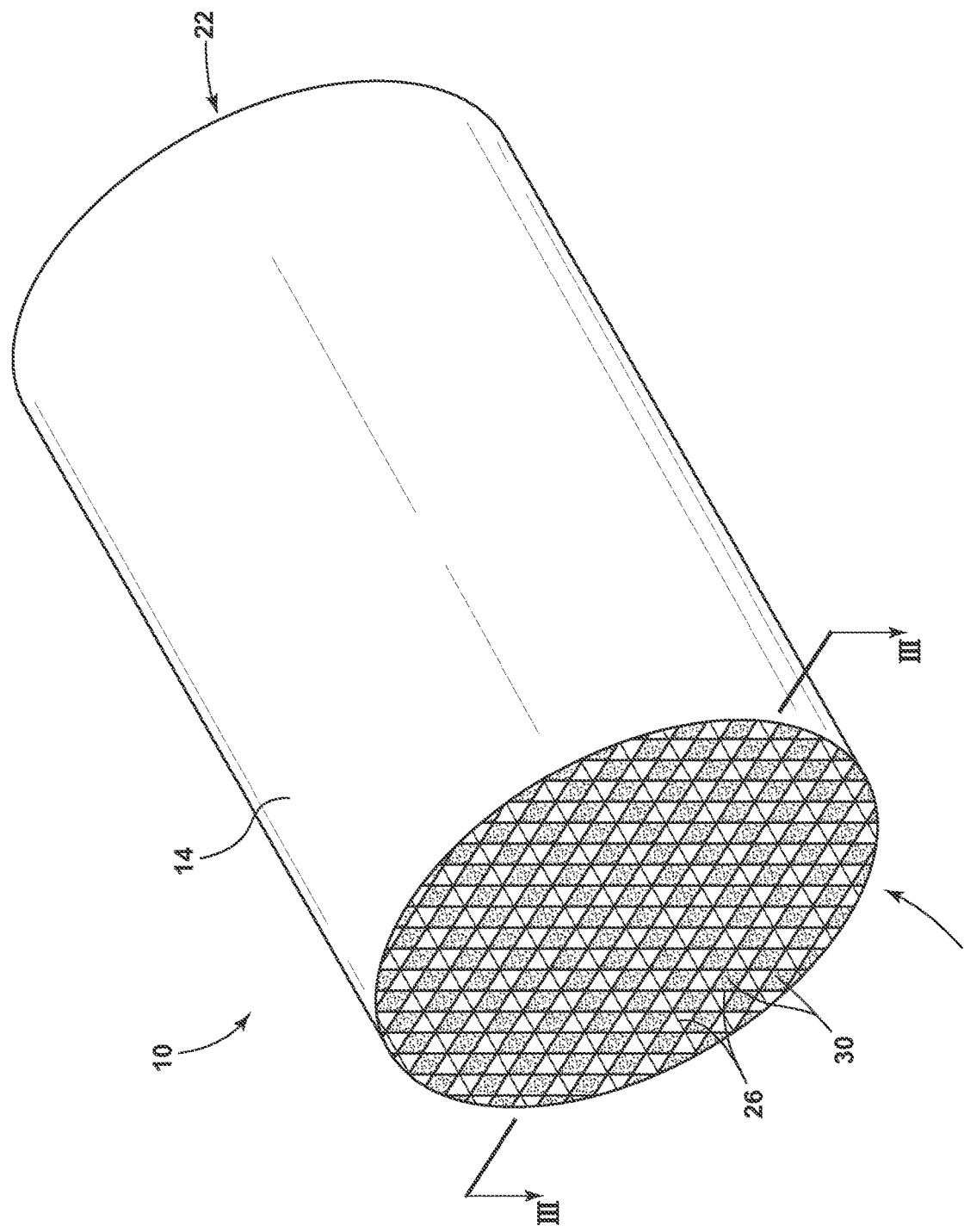
FIG. 2 is a perspective view of the filter including a plurality of plugs, according to at least one example.

FIGS. 1 and 2 show a filter 10 comprising a honeycomb body 14 comprising a first end 18 and a second end 22. The honeycomb body 14 comprises intersecting cell walls that form a plurality of channels 26 extending from the first end 18 to the second end 22. According to various examples, a filter 10 comprises a plurality of plugs 30 positioned within at least some of the channels 26, in some embodiments at first and second ends 18, 22, of the honeycomb body 14.

Referring now to FIG. 1, the honeycomb body 14 comprises a matrix of intersecting cell walls comprise thin, porous walls 38 which extend across and between the first and second ends 18, 22 to form a large number of adjoining channels 26. The channels 26 extend between and are open at the first and second ends 18, 22 of the honeycomb body 14. According to various examples, the channels 26 are mutually parallel with one another. The honeycomb body 14 may comprise a transverse cross-sectional channel density of from about 10 channels/in$^2$ to about 900 channels/in$^2$, or from about 20 channels/in$^2$ to about 800 channels/in$^2$, or from about 30 channels/in$^2$ to about 700 channels/in$^2$, or from about 40 channels/in$^2$ to about 600 channels/in$^2$, 50 channels/in$^2$ to about 500 channels/in$^2$, or from about 60 channels/in$^2$ to about 400 channels/in$^2$, or from about 70 channels/in$^2$ to about 300 channels/in$^2$, or from about 80 channels/in$^2$ to about 200 channels/in$^2$, or from about 90 channels/in$^2$ to about 100 channels/in$^2$, or form about or from about 100 channels/in$^2$ to about 200 channels/in$^2$ or any and all values and ranges therebetween. The walls 38 may have a thickness in mils (i.e., thousands of an inch) of from about 1 mil to about 15 mils, or from about 1 mil to about 14 mils, or from about 1 mil to about 13 mils, or from about 1 mil to about 12 mils, or from about 1 mil to about 11 mils, or from about 1 mil to about 10 mils, or from about 1 mil to about 9 mils, or from about 1 mil to about 8 mils, or from about 1 mil to about 7 mils, or from about 1 mil to about 14 mils, or from about 1 mil to about 6 mils, or from about 1 mil to about 5 mils, or from about 1 mil to about 4 mils, or from about 1 mil to about 3 mils, or from about 1 mil to about 2 mils or any and all values and ranges therebetween. It will be understood that although the channels 26 are depicted with a generally square cross-sectional shape, the channels 26 may have a circular, triangular, rectangular, pentagonal or higher order polygon cross-sectional shape without departing from the teachings provided herein.

The honeycomb body 14 may be formed of a variety of materials including ceramics, glass-ceramics, glasses, metals, and by a variety of methods depending upon the material selected. According to various examples, a green body which is transformed into honeycomb body 14 may be initially fabricated from plastically formable and sinterable finely divided particles of substances that yield a porous material after being fired. Suitable materials for a green body which is formed into the honeycomb body 14 comprise metallics, ceramics, glass-ceramics, and other ceramic based mixtures. In some embodiments, the honeycomb body 14 is comprised of a cordierite (e.g., $2MgO \cdot 2Al_2O_3 \cdot 5SiO_2$) material.

Referring to FIG. 2, the filter 10 can be formed from the honeycomb body 14 by closing or sealing a first subset of channels 26, such as at the first end 18 with plugs 30, and the remaining channels 26 (for example alternating channels 26) being closed at the second end 22 of the honeycomb body 14, using other plugs 30. In operation of the filter 10, fluids such as gases carrying solid particulates are brought under pressure to the inlet face (e.g., the first end 18). The gases then enter the honeycomb body 14 via the channels 26 which have an open end at the first end 18, pass through the walls 38 of the porous cell walls, and out the channels 26 which have an open and at the second end 22. Passing of the gasses though the walls 38 may allow the particulate matter in the gases to remain trapped by the walls 38.

Figure 3:
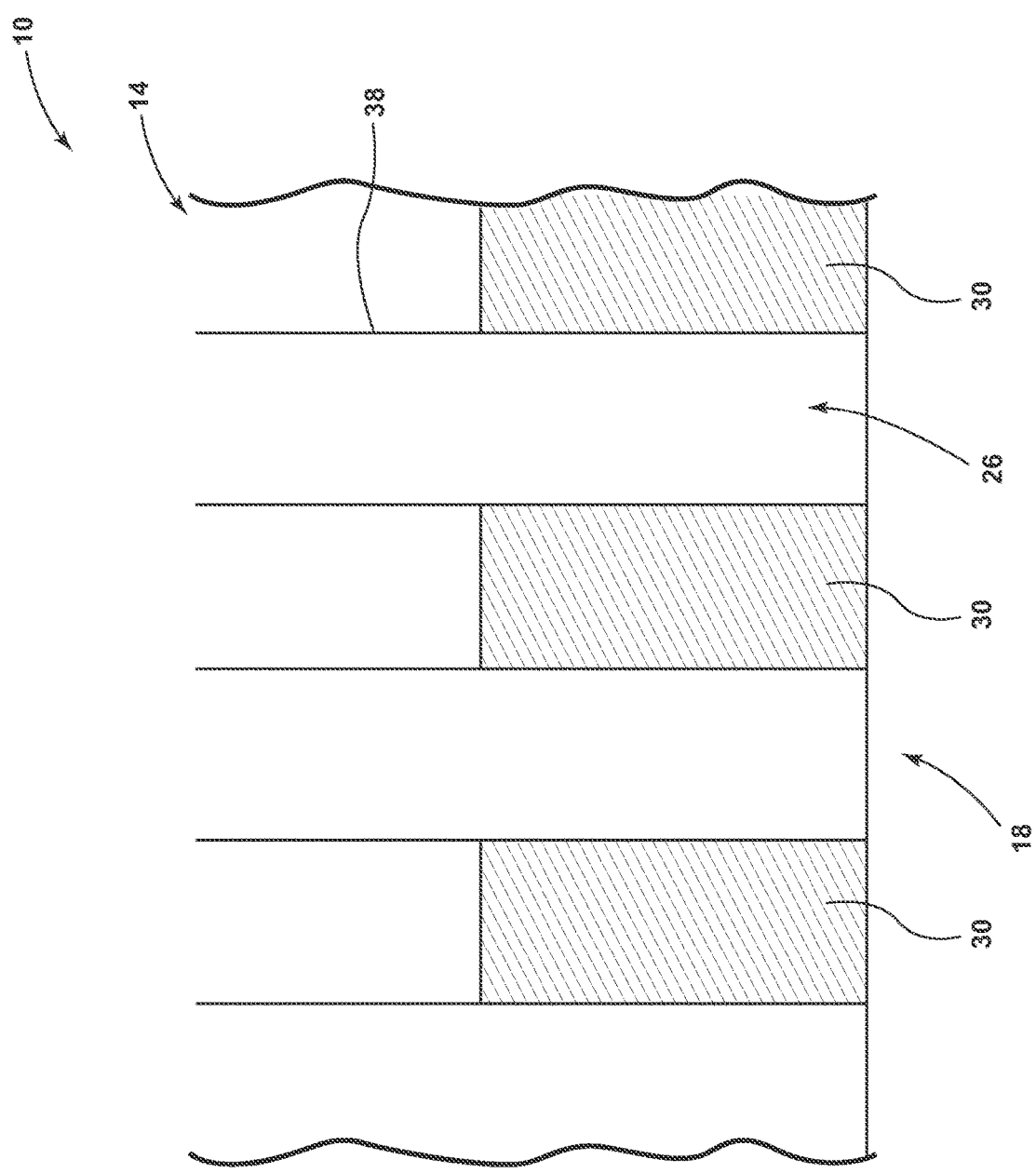
FIG. 3 is a cross-sectional view taken at line of FIG. 2, according to at least one example.

As schematically illustrated in FIGS. 2 and 3, plugs 30 may be positioned in the channels 26 in an alternating manner. In the depicted example, the plugs 30 are positioned across the first and second ends 18, 22 of the honeycomb body 14 in a "checkerboard" pattern, but it will be understood that other patterns may also be applied. In the checkerboard pattern, each of an open channel's 26 nearest neighbor channels 26 on an end (e.g., either the first or second end 18, 22) includes a plug 30.

The plugs 30 may have an axial length, or longest dimension extending substantially parallel with the channels 26, of about 0.5 mm or greater, of about 1 mm or greater, of about 1.5 mm or greater, of about 2 mm or greater, of about 2.5 mm or greater, of about 3 mm or greater, of about 3.5 mm or greater, of about 4 mm or greater, of about 4.5 mm or greater, of about 5 mm or greater, of about 5.5 mm or greater, of about 6.0 mm or greater, of about 6.5 mm or greater. For example, the plugs 30 may have an axial length of from about 0.5 mm to about 10 mm, or from about 1 mm to about 9 mm, or from about 1 mm to about 8 mm, or from about 1 mm to about 7 mm, or from about 1 mm to about 6 mm, or from about 1 mm to about 5 mm, or from about 1 mm to about 4 mm, or from about 1 mm to about 3 mm, or from about 1 mm to about 2 mm or any and all value and ranges therebetween. According to various examples, the plurality of plugs 30 located on the first end 18 of the body 14 may have a different length than the plugs 30 positioned on the second end 22 of the body 14.

The variation in length for a plurality of plugs 30 may be expressed as a standard deviation and is calculated as the square root of variance by determining the variation between each length relative to the average length of the plugs 30. The standard deviation of the plurality of plugs 30 is a measure of the variance in the length of plugs 30 positioned, for example, on either the first or second ends 18, 22 of the honeycomb body 14. All of the plurality of plugs 30 on one end (e.g., the first or second end 18, 22) may have a standard deviation in length of from about 0.1 mm to about 3.0 mm. For example, a standard deviation in length of the plugs 30 may be about 3.0 mm or less, about 2.9 mm or less, about 2.8 mm or less, about 2.7 mm or less, about 2.6 mm or less, about 2.5 mm or less, about 2.4 mm or less, about 2.3 mm or less, about 2.2 mm or less, about 2.1 mm or less, about 2.0 mm or less, about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1.0 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm or less or any and all values and ranges therebetween. According to various examples, the plurality of plugs 30 located on the first end 18 of the body 14 may have a different standard deviation than the plugs 30 positioned on the second end 22 of the body 14.

Figure 4:
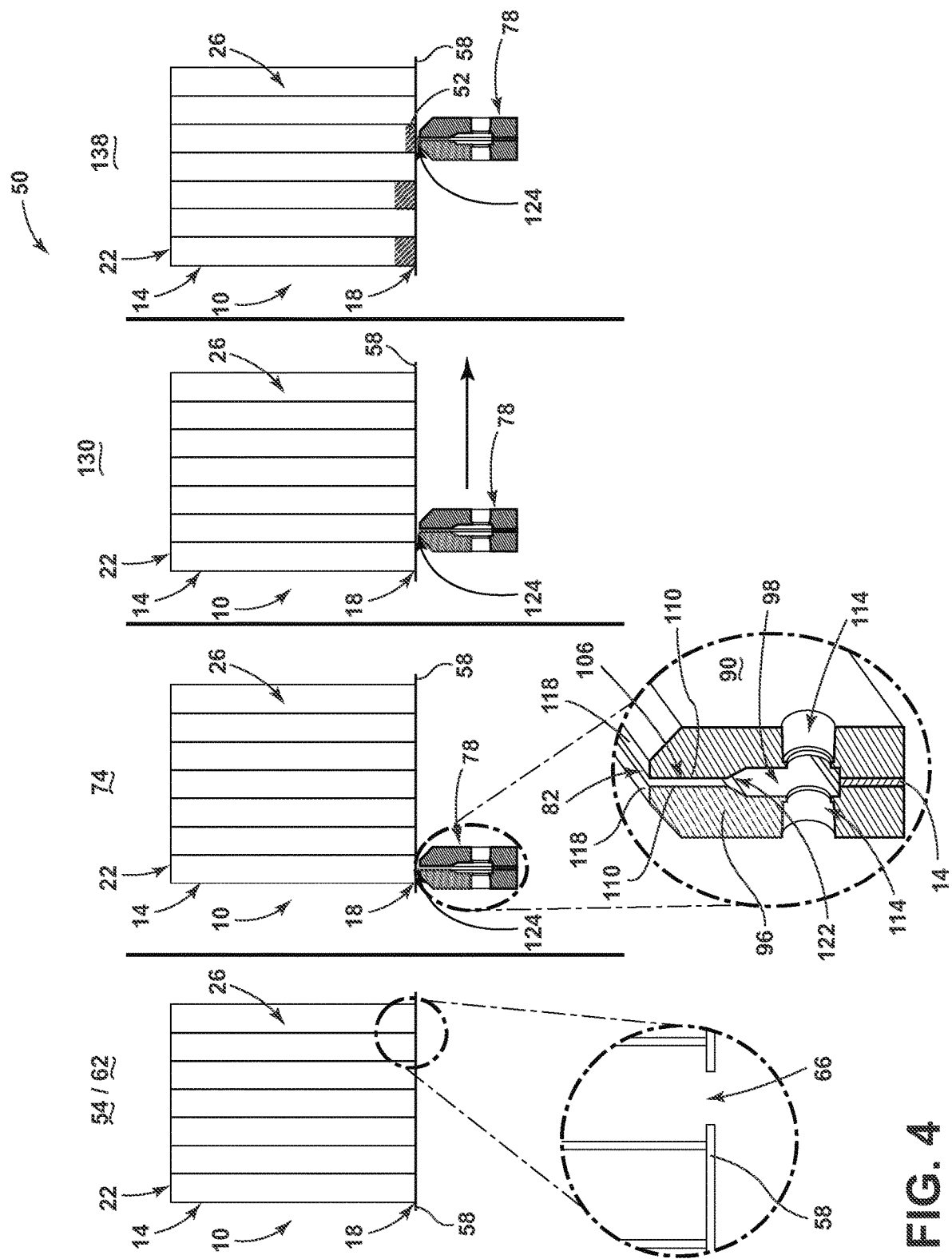
FIG. 4 is a schematic view of an exemplary method, according to at least one example.

Referring now to FIG. 4, depicted is a method 50 of plugging the honeycomb body 14 using a plugging cement 52. The method 50 may begin with a step 54 of applying a mask layer 58 to an end (e.g., the first end 18) of the honeycomb body 14 which includes the plurality of channels 26. The mask layer 58 may be comprised of a metal, polymer, a composite material and/or combinations thereof. For example, the mask layer 58 may be comprised of a rice paper, cellophane, plexiglass, biaxially-oriented polyethylene terephthalate, other materials and/or combinations thereof. A mask layer 58 can be positioned on the first and/or second ends 18, 22 of the honeycomb body 14. The mask layer 58 may cover a portion, a majority, substantially all or all of the first and/or second ends 18, 22. The mask layer 58 may have the same size and shape as the first and/or second ends 18, 22, or the size and/or shape of the mask layer 58 may be different. For example, the mask layer 58 may have the same general shape as a cross-section of the honeycomb body 14 (e.g., generally circular) and may have a greater diameter than the honeycomb body 14 such that the mask layer 58 extends radially outwardly from the honeycomb body 14. The mask layer 58 may extend outwardly from the honeycomb body 14 about 0.5 cm or greater, about 1.0 cm or greater, about 1.5 cm or greater, about 2.0 cm or greater, about 2.5 cm or greater, about 3.0 cm or greater, about 3.5 cm or greater, about 4.0 cm or greater, about 4.5 cm or greater, about 5.0 cm or greater, about 5.5 cm or greater, about 6.0 cm or greater or any and all values and ranges therebetween. The mask layer 58 may be coupled to the honeycomb body 14. For example, the honeycomb body 14 and/or mask layer 58 may have an adhesive adhered thereto, or disposed between, to allow sticking of the mask layer 58 to the honeycomb body 14. In another example, a band may be positioned around an exterior surface of the honeycomb body 14 to retain the mask layer 58 to the honeycomb body 14.

Next, a step 62 of forming a hole 66 in the mask layer 58 proximate one of the plurality of channels 26 is performed. The hole 66 facilitates fluid communication between the channel 26 and an environment on the other side of the mask layer 58. The hole 66 may be formed through mechanical force (e.g., with a punch) or by a laser 60. According to various examples, the mask layer 58 may include a plurality of holes 66 positioned across the mask layer 58. For example, the holes 66 may be positioned in a pattern (e.g., a checkerboard-like pattern) across the mask layer 58. In checkerboard-like patterns, the holes 66 are positioned over every other channel 26 at a face (e.g., the first and/or second ends 18, 22). According to various examples, a plurality of holes 66 may be positioned over a plurality of the channels 26. The holes 66 facilitate fluid communication between the channel 26 and an environment around the mask layer 58. The holes 66 may be formed through mechanical force (e.g., with a punch) or through a laser.

The holes 66 may take a variety of shapes. For example, the holes 66 may have a circular, oval, oblong, triangular, square, rectangular or higher order polygon shape. The holes 66 may have an area of from about 1% to about 80% of a cross-sectional area of the corresponding respective channel 26 aligned with the hole 66. For example, the holes 66 may have an area of about 80% or less, about 75% or less, about 70% or less, about 65% or less, about 55% or less, about 50% or less, about 45% or less, about 40% or less, about 35% or less, about 30% or less, about 25% or less, about 20% or less, about 15% or less, about 10% or less, about 5% or less of a cross-sectional area of the channel 26 proximate the holes 66. It will be understood that any and all values and ranges therebetween are contemplated. Use of the term aligned is meant to mean that the holes 66 may be positioned in a variety of locations over the channels 26 to allow fluid communication of the plugging mixture 74 through the hole 66 and into the channel 26. For example, the holes 66 may be positioned in a middle, a side, or around edges of the channels 26. Further, it will be understood that two or more holes 66 may be positioned proximate each channel 26.

Next, a step 74 of positioning a nozzle 78 defining an opening 82 proximate the mask layer 58 is performed. According to various examples, the opening 82 of the nozzle 78 may be a slot die opening 82. As such, step 74 may include positioning the nozzle 78 defining the slot die example of the opening 82 proximate the mask layer 58. In such examples of a slot die opening 82, a length of the opening 82 may be greater than a width of the opening 82. The width of the opening 82 may be from about 0.1 mm to about 10.0 mm, or from about 0.2 mm to about 5.0 mm, or from about 0.5 mm to about 4.0 mm, or from about 1 mm to about 3.0 mm or from about 1.5 mm to about 2.5 mm. The length of the slot die opening 82 may be from about 10 mm to about 500 mm, or from about 10 mm to about 400 mm, or from about 10 mm to about 300 mm, or from about 10 mm to about 200 mm, or from about 10 mm to about 100 mm, or from about 10 mm to about 90 mm, or from about 10 mm to about 80 mm, or from about 10 mm to about 70 mm, or from about 10 mm to about 60 mm, or from about 10 mm to about 50 mm, or from about 10 mm to about 40 mm, or from about 10 mm to about 30 mm, or from about 10 mm to about 20 mm or any and all values and ranges therebetween. For example, the length of the slot die opening 82 may be about 10 mm or greater, about 20 mm, or greater, about 30 mm or greater, about 40 mm or greater, about 50 mm, or greater, about 60 mm or greater, about 70 mm or greater, about 80 mm, or greater, about 90 mm or greater, about 100 mm or greater, about 200 mm, or greater, about 300 mm or greater or any and all values and ranges therebetween. According to various examples, the length of the slot die opening 82 may be longer than a portion, a majority, substantially, or substantially all of a maximum width (e.g., diameter in circular examples of the honeycomb body 14) of the honeycomb body 14. In other words, for cylindrical examples of the honeycomb body 14 the length of the slot die opening 82 may correspond to about 10% or greater, about 20% or greater, about 30% or greater, about 40% or greater, about 50% or greater, about 60% or greater, about 70% or greater, about 80% or greater, about 90% or greater, about 100% or greater of the maximum width or diameter of the honeycomb body 14. It will be understood that any and all values and ranges therebetween are contemplated. As such, positioning the nozzle 78 defining the slot die opening 82 may include positioning the nozzle 78 such that the slot die opening 82 is positioned across a majority or an entirety of a maximum width of the honeycomb body 14.

The slot die opening 82 examples of the nozzle 78 may include two bodies 90 and a shim 94. The shim 94 is configured to space the bodies 90 a fixed distance apart. According to various examples, the bodies 90 may be held together by one or more fasteners. The bodies 90 may or may not be mirrored relative to one another. According to various examples, the bodies 90 and/or shim 94 may be composed of a metal, polymer, composite material and/or combinations thereof. In metal examples of the bodies 90 and/or shim 94, the metal may be aluminum, iron, steel, magnesium and/or other metallic materials. One or more of the bodies 90 may define an internal cavity 98, or the bodies 90 may cooperate to define the internal cavity 98. In slot die examples of the nozzle 78, the internal cavity 98 may form the initial stages of a rectangular flow field. The design of the internal cavity 98 may be based on the rheological properties of plugging cement 52 used in the nozzle 78 such that a desired cross-direction flow and shear rate prevents stagnation of the plugging cement 52 by the nozzle 78. A transition zone 102 decreases the volume of the internal cavity 98 and leads to a slot region 106 between internal lands 110 defined by each of the bodies 90. The dimensions of the slot region 106 (e.g., the height and length of the internal lands 110) are set to provide a desired output flow profile (e.g., uniform flow rate across the opening 82, but may also provide variable output across the length of the opening 82).

According to various examples, each of the bodies 90 may define an inlet 114 through which the plugging cement 52 may enter the internal cavity 98 of the nozzle 78. Each of the inlets 114 may be coupled with one or more cement delivery systems for delivering the plugging cement 52 to the nozzle 78. According to various examples, the cement delivery system may provide uniformly mixed plugging cement 52 with minimized entrained air. Such a reduction or elimination of entrained air within the plugging cement 52 may make the plugging cement 52 fluidly incompressible. Such a fluidly incompressible plugging cement 52 may be advantageous in allowing greater pressures to develop within the plugging cement 52 as it passes from the nozzle 78 to the honeycomb body 14. According to various examples, the cement delivery system may include a positive displacement pump in which mass flow rate of the plugging cement 52 can be controlled. According to various examples, the cement delivery system may include a twin screw compounder with or without vacuum chambers. According to various examples, the cement delivery system may include a recirculation loop to return unused plugging cement 52 back to the progressive cavity pump which can be utilized to keep the plugging cement 52 under uniform flow conditions.

The cement delivery system may be configured to provide a static or variable amount of plugging cement 52 to the nozzle 78. For example, the cement delivery system may supply the plugging cement 52 at a rate of from about 50 lbs/hr to about 400 lbs/hr, or from about 100 lbs/gr to about 300 lbs/hr, or from about 150 lbs/hr to about 200 lbs/hr or any and all values and ranges therebetween.

Each of the bodies 90 may define an external land 118 proximate a tip of the nozzle 78 (i.e., proximate the honeycomb body 14 and/or mask layer 58). The external lands 118 of the nozzle 78 may have a width (i.e., as measured in a direction normal to the internal lands 110) of from about 1 mm to about 20 mm, or from about 2 mm to about 15 mm, or from about 3 mm to about 10 mm. For example, the external lands 118 may have a width of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm or any and all values and ranges therebetween. It will be understood that the external lands 118 may have different widths than one another. The external lands 118 may have a length which is the same as the nozzle 78 or may be different. The length of the external lands 118 as well as the angle of the external lands 118 with respect to the internal lands 110 can be adjusted to seal against higher dispensing pressures and to reduce leakage of excess plugging cement 52. According to various examples, the external lands 118 serve as reference surfaces to form a dynamic seal (i.e., as formed by relative motion between the nozzle 78 and the mask layer 58 of the honeycomb body 14) between the mask layer 58 of the honeycomb body 14 and the nozzle 78.

Step 74 of positioning the nozzle 78 including the opening 82 proximate the mask layer 58 may be performed in a variety of manners. For example, the nozzle 78 may be positioned above, to a side and/or beneath the honeycomb body 14. According to various examples, the opening 82 of the nozzle 78 may be positioned beneath the honeycomb body 14 such that the honeycomb body 14 is positioned above the opening 82. It will be understood that on an opposite side of the honeycomb body 14 from the nozzle 78, the honeycomb body 14 may be restrained or otherwise blocked to prevent movement of the honeycomb body 14 away from the nozzle 78.

Positioning of the nozzle 78 proximate the mask layer 58 may be performed such that a gap 124 is formed between the mask layer 58 and the opening 82 of the nozzle 78. The gap 124 may have a distance, as measured from the external lands 118 of the nozzle 78 to the mask layer 58, of from about 0.1 mm to about 2.0 mm, or from about 0.1 mm to about 1.0 mm. For example, the gap 124 may have a distance of about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm or any and all values and ranges therebetween. Coordination of the distance of the gap 124 in conjunction with the width of the external lands 118 is used to create a dynamic seal for the plugging cement 52 to pass from the nozzle 78 to the honeycomb body 14. For example, as the plugging cement 52 is delivered from the opening 82, a small amount of the cement 52 will follow the path created between the external lands 118 and the mask layer 58. In other words, the plugging cement 52 may tend to extend into the gap 124. Controlling the distance of the gap 124 can increase the pressure drop across the external lands 118 to a level in which the remaining plugging cement 52 delivered by the opening 82 will be under a sufficient pressure gradient to pass through the holes 66 in the mask layer 58 and into the channels 26.

According to various examples, the opening 82 of the nozzle 78 may be at an angle relative to the mask layer 58. The angle of the opening 82 relative to the mask layer 58 is measured as an angle from a direction perpendicular to mask layer 58. The opening 82 of the nozzle 78 may be at an angle of from about 0° about 20°, or from about 0.1° to about 20°, or from about 2° to about 18°, or from about 4° to about 10°, or from about 5° to about 7° relative to the mask layer 58. For example, the opening 82 of the nozzle 78 may have an angle relative to the mask layer 58 of about 0.1°, about 0.5°, about 1°, about 2°, about 3°, about 4°, about 5°, about 6°, about 7°, about 8°, about 9°, about 10°, about 11°, about 12°, about 13°, about 14°, about 15°, about 16°, about 17°, about 18°, about 19°, about 20° or any and all values and ranges therebetween. It will be understood that the opening 82 is substantially planar with the external lands 118 of the nozzle 78. As such, any and all values and ranges described in connection with the opening 82 may equally be applied to an angle between the external lands 118 and the mask layer 58. Further, it will be understood that although it is contemplated that one or more of the nozzle 78 and the honeycomb body 14 is angled relative to the other, the external lands 118 of the nozzle 78 may be machined in a manner such that an angle is formed despite the nozzle 78 and the honeycomb body 14 are parallel with one another.

In examples where the opening 82 is angled relative to the mask layer 58, the gap 124 achieves a converging profile between the external lands 118 of the nozzle 78 and the mask layer 58 of the honeycomb body 14. The converging profile of the gap 124, in combination with relative motion between the honeycomb body 14 and the nozzle 78 as explained below, increases the shear stress or pressure on the plugging cement 52, thereby enabling higher plugging pressures and/or reduced leakage of excess plugging cement 52. The angular orientation between the opening 82 and the mask layer 58 also results in a single edge being in closest proximity to the mask layer 58 which provides a smoothing effect on excess plugging cement 52 remaining on the mask layer 58 to improve uniformity of the resulting plugs 30.

Next a step 130 of moving at least one of the nozzle 78 and the honeycomb body 14 relative to one another is performed. For example, the honeycomb body 14 may be moved relative to the nozzle 78, the nozzle 78 may be moved relative to the honeycomb body 14, or both the nozzle 78 and the honeycomb body 14 may be moved simultaneously. It will be understood that motion of the honeycomb body 14 and/or nozzle 78 may be translational and/or rotational. Irrespective of whether the nozzle 78 moves or the honeycomb body 14 moves, the opening 82 is exposed to different sets of the plurality of holes 66 of the mask layer 58 and the channels 26 of the honeycomb body 14 as the relative motion is taking place. In examples where the opening 82 extends across the entirety of the honeycomb body 14, the honeycomb body 14 and/or nozzle 78 may make a single pass by one another. In other words, if the opening 82 of the nozzle 78 is sufficiently wide to cover the entire diameter, or widest part, of the honeycomb body 14, only one pass of the nozzle 78 or honeycomb body 14 may be sufficient. In examples where the opening 82 does not extend across the entirety of the honeycomb body 14, the honeycomb body 14 and/or nozzle 78 may make multiple passes to cover the entirety of the mask layer 58.

Additionally or alternatively, the honeycomb body 14 and/or opening 82 of the nozzle 78 may be rotated such that an entirety of the mask layer 58 is traversed by the opening 82. For example, where the nozzle 78 and/or opening 82 is shorter than a diameter or longest cross-sectional length of the honeycomb body 14, one or more of the honeycomb body 14 and nozzle 78 may be rotated and/or translated such that the opening 82 traverses the entirety of the mask layer 58. In a specific example, the length of the opening 82 may be approximately equal to a radius of the honeycomb body 14 such that the honeycomb body 14 and/or nozzle 78 may be rotated a single time to traverse the opening 82 across the entire mask layer 58. For a given distance of the gap 124 and traversing rate of the honeycomb body 14 and nozzle 78 relative to one another, sufficient resistance to flow develops in the plugging cement 52 located in the gap 124 to enable the plugging cement 52 to enter the channels 26 in the honeycomb body 14 to achieve desired depth of the resulting plugs 30. It will be understood that in rotational examples of the relative motion, the opening 82 of the nozzle 78 may be adjusted to provide variable flow of plugging cement 52 to account for the differences in speed of the respective points of the opening 82.

The relative motion between the honeycomb body 14 and the nozzle 78 may be accomplished at a variety of speeds. For example, the honeycomb body 14 and nozzle 78 may be moved at a speed of about 1 mm/s to about 50 mm/s, or from about 2 mm/s to about 40 mm/s, or about 3 mm/s to about 30 mm/s, or from about 4 mm/s to about 20 mm/s, or from about 5 mm/s to about 10 mm/s. For example, the honeycomb body 14 and nozzle 78 may be moved at a speed of about 1 mm/s, about 2 mm/s, about 3 mm/s, about 4 mm/s, about 5 mm/s, about 6 mm/s, about 7 mm/s, about 8 mm/s, about 9 mm/s, about 10 mm/s, about 12 mm/s, about 14 mm/s, about 16 mm/s, about 18 mm/s, about 20 mm/s, about 22 mm/s, about 25 mm/s, about 30 mm/s, about 35 mm/s, about 40 mm/s, about 45 mm/s, about 50 mm/s or any and all values and ranges therebetween.

Next, a step 138 of passing the plugging cement 52 through the opening 82 defined by the nozzle 78 against the mask layer 58 such that the plugging cement 52 passes through the plurality of holes 66 in the mask layer 58 and enters the plurality of channels 26 of the honeycomb body 14 is performed. Although depicted and described as separate steps, it will be understood that steps 130 and 138 may be performed separately and/or simultaneously. According to various examples, the honeycomb body 14 is mounted such that the channels 26 with the proximate holes 66 will have a lower resistance to flow of the plugging cement 52 resulting in preferential flow to fill the channels 26 with the plugging cement 52 through the holes 66. The plugging cement 52 may be passed, or dispensed, from the opening 82 of the nozzle 78 at a pressure of from about 0.1 psi to about 25 psi, or from about 1.0 psi to about 20 psi, or from about 2.0 psi to about 15 psi, or from about 3.0 psi to about 13 psi as measured at the mask layer 58. For example, the plugging cement 52 may have a pressure as measured at the mask layer 58 of about 0.1 psi, about 0.5 psi, about 1.0 psi, about 2.0 psi, about 3.0 psi, about 4.0 psi, about 5.0 psi, about 6.0 psi, about 7.0 psi, about 8.0 psi, about 9.0 psi, about 10.0 psi, about 11.0 psi, about 12.0 psi, about 13.0 psi, about 14.0 psi, about 15.0 psi, about 16.0 psi, about 17.0 psi, about 18.0 psi, about 19.0 psi, about 20.0 psi, about 21.0 psi, about 22.0 psi, about 23.0 psi, about 24.0 psi, about 25.0 psi or any and all values and ranges therebetween.

The plugging cement 52 may be extruded from the opening 82 of the nozzle 78 with a mass flow rate that may remain constant across the honeycomb body 14 or may be variable. The mass flow rate of the plugging cement 52 is important as the mass flow rate may affect thickness or uniformity of the plugs 30. For example, an increased mass flow rate may increase a depth that the plugging cement 52 reaches within the channels 26 of the honeycomb body 14. The volume or mass of plugging cement 52 needed to fill the channels 26 may vary with position as the nozzle 78 and honeycomb body 14 change positions with respect to each other. For example, the nozzle 78 may increase or decrease the volume of plugging cement 52 delivered as the opening 82 passes by various points of the honeycomb body 14. Such a feature may be advantageous in increasing an efficiency of the method 50 (e.g., less excess plugging cement 52), varying the depth of the plugs 30 across the honeycomb body 14 (e.g. to provide increased depth in specific areas) and/or by altering the shape or adhesion of the plugs 30 within the honeycomb body 14.

One method to accommodate the change in the amount of plugging cement 52 delivered as a function of position is to synchronize the mass flow rate of cement 52 provided to the nozzle 78 with the traverse rate of the honeycomb body 14 and/or nozzle 78. Mass flow control is the predominant method of maintaining a uniform coated thickness of plugging cement 52 as a function of speed. The mass flow rate of the plugging cement 52 may be controlled by a variety of features. In a first example, the cross-width thickness of the plugging cement 52 leaving the opening 82 may be controlled. Cross-width thickness control of the plugging cement 52 can be controlled in variety of manners. For example, given a plugging cement 52 of known rheological properties, the internal cavity 98, length of the internal lands 110 and dimensions of the opening 82 can be manipulated to provide a desired cross-width thickness. In a second example, the opening 82 may be equipped with an internal deckle within the nozzle 78 to block the flow of plugging cement 52, thereby limiting the width of the plugging cement 52 exiting the opening 82. The flow of plugging cement 52 can be adjusted to follow the geometry of the honeycomb body 14 by controlling mass flow and/or pressure drop. According to various examples, the deckle positioning may be synchronized to part geometry. In a third example, the slot height (e.g., height of the internal lands 110) across the width of the opening 82 may be varied to correspond with geometry of the honeycomb body 14 through the use of a flexible external die lip that can be actuated to reduce a flow in accordance with the geometry of the honeycomb body 14. In a fourth example, the internal lands 110 may be fitted with a flexible membrane that can be externally actuated to reduce the size of the opening 82 and reduce the flow of the plugging cement 52. In a fifth example, the nozzle 78 may be equipped with a plurality of internal flow cavities each connected to an independently controlled plugging cement 52 mass flow delivery system that could be controlled to synchronize flow with the geometry of the honeycomb body 14. In a sixth example, the opening 82 of the nozzle 78 may be varied by machining a predetermined profile into one or both of the internal lands 110 to reduce flow in accordance with the part geometry. In a seventh example, a cylindrical rod may be added to one or more of the inlets 114. The rod is machined with an eccentric profile or a tapering profile that rotation will reduce the flow path of plugging cement 52 into the internal cavity 98 and thereby reduce flow in accordance with the geometry of the honeycomb body 14.

After the plugging cement 52 has been dispensed into the plurality of channels 26, the mask layer 58 may be removed from the honeycomb body 14. The plugging cement 52 within the honeycomb body 14 may then be cured, fired or otherwise sintered to form the plurality of plugs 30 within the channels 26.

Use of the nozzle 78 may offer an increase in the production rate of filters 10. For example, use of the nozzle 78 may allow production of the filters 10 at a rate which is a factor of 2 or 3 times the production rate of conventional wall flow filter methods. The increased production rate is attributable to the continuous nature of the relative motion between the nozzle 78 and the honeycomb body 14. Further, use of the method 50 is scalable such that multiple stations employing the method 50 may be implemented in a manufacturing setting. Also, use of slot die examples of the nozzle 78 and opening 82 provide consistent coatings of the plugging cement 52 to the honeycomb body 14. For example, the thickness, density, and strength of the plugging cement 52 applied to the honeycomb body 14 are very uniform in both the traversing direction and cross direction and subject to little variation over time. As the plugging cement 52 is dispensed through the nozzle 78, and not continuously exposed to the environment, the plugging cement 52 may remain fresh (e.g., un-oxidized or dehydrated) and therefore may maintain uniform properties. In conventional plugging methods of wall flow filters, the plugging cement 52 may be exposed to the environment for a prolonged period leading to changes in the rheology of the plugging cement 52. Such rheology changes may result in the improper formation of the plugs 30 and/or damage to the honeycomb body 14. As the volume or mass flow rate of the plugging cement 52 from the nozzle 78 may be adjusted, the rate at which the plugging cement 52 enters the channels 26 may be adjusted. Such adjustment of the rate may be advantageous in providing a uniform and consistent plug 30. Use of the gap 124 between the nozzle 78 and the mask layer 58 to form the dynamic seal allows for the plugging cement 52 of the dynamic seal to be different for each honeycomb body 14 which passes by the nozzle 78. Such a feature is advantageous in producing consistent filters through use of the method 50. As the nozzle 78 may adjust various properties of the opening 82, the nozzle 78 may be configured to operate with a variety of different plugging cements 52, each with different rheological properties, and/or different filters 10 with different dimensions.

EXAMPLES

Figure 5:
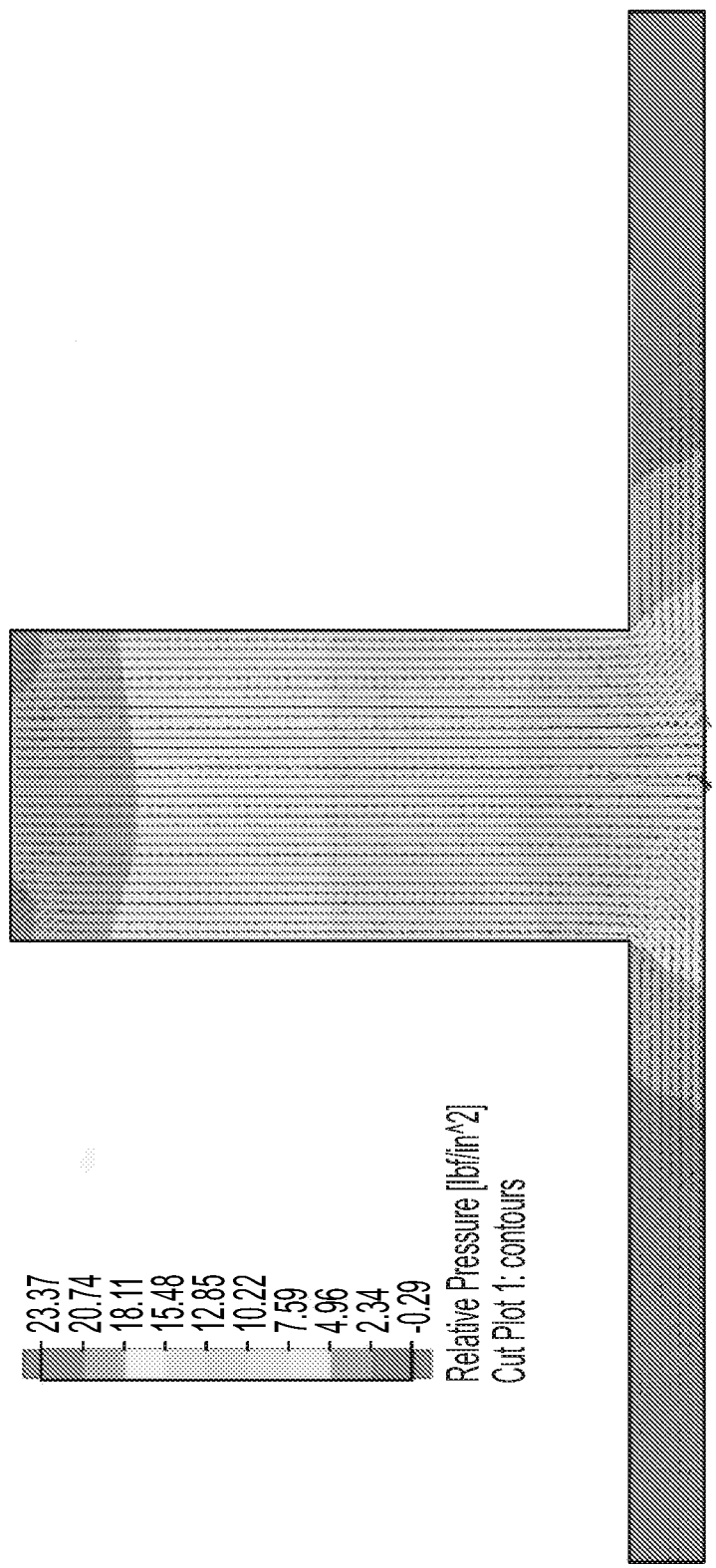
FIG. 5 is a contour plot of a plugging mixture leaving a dispenser provided by a computer simulation.
Figure 6:
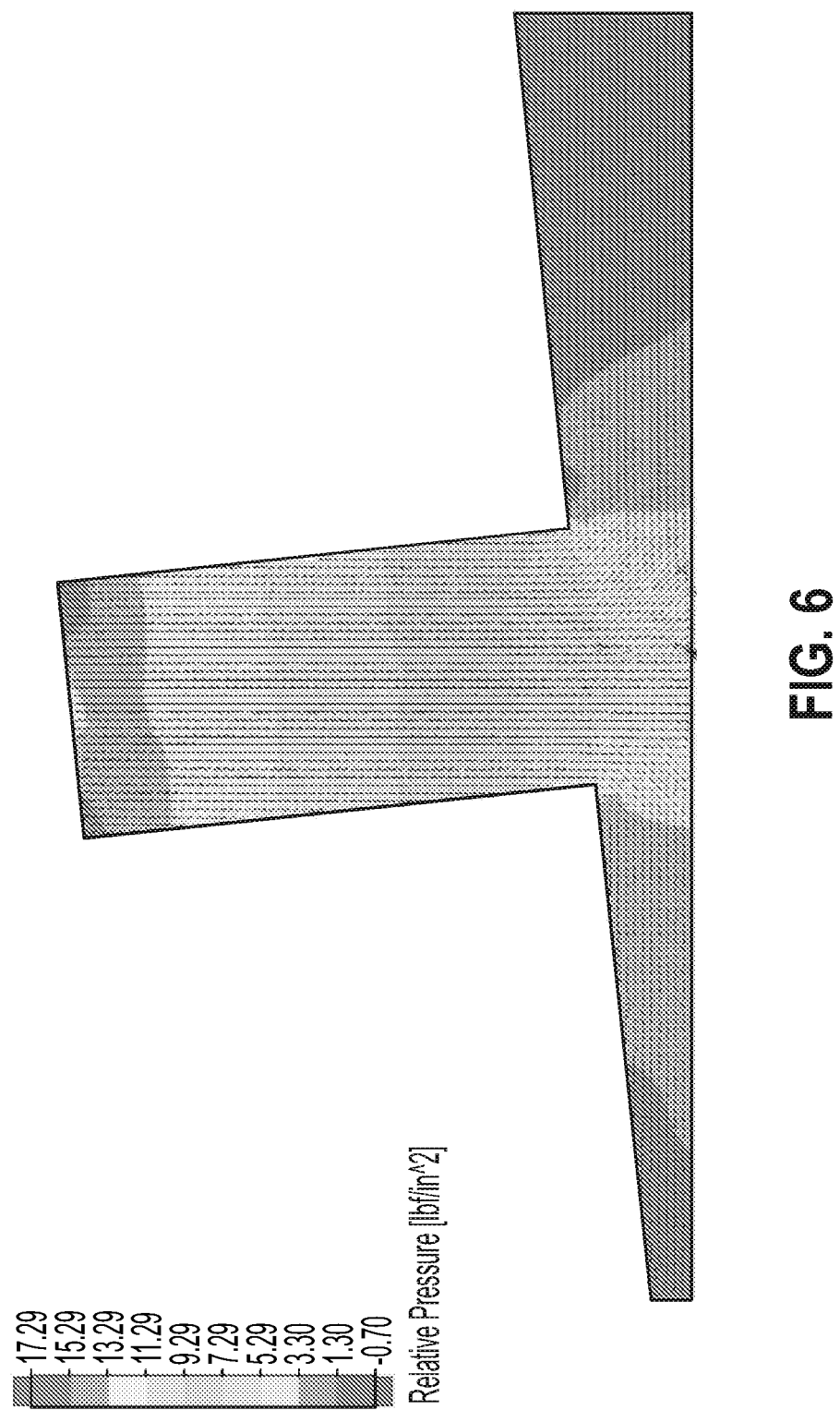
FIG. 6 is a contour plot of a plugging mixture leaving a dispenser provided by a computer simulation.

Referring now to FIGS. 5 and 6, depicted are computer simulation results for a method of forming a wall flow filter consistent with the method 50 of the present disclosure. The computer simulations provide a computational contour plot of the flow of a plugging mixture (e.g., the plugging cement 52) from a dispenser (e.g., the nozzle 78) against a wall flow filter (e.g., the honeycomb body 14). The computational model used was a two-dimensional model of the localized external surfaces (e.g., the external lands 118) of the dispenser and a surface (e.g., the mask layer 58) of the wall flow filter. The simulation of FIG. 5 was performed with the dispenser being oriented substantially perpendicular to the wall flow filter. In other words, the external surfaces are about parallel with the surface of the wall flow filter. The simulation of FIG. 6 was performed with the dispenser being oriented at an angle of about 6° off a direction perpendicular to the wall flow filter. In other words, the external surfaces are not parallel with the surface of the wall flow filter. The dispenser is angled in a direction opposite to the traversing direction of the dispenser. The contour plot provides the pressure distribution developed in the plugging mixture as it exits the dispenser and contacts the wall flow filter. Velocity vectors of the plugging mixture are superimposed on the contour plot. For purposes of the simulation, the plugging mixture was provided by the dispenser at a rate of 180 pounds per hour and with the dispenser traversing the wall flow filter at a rate of about 10 mm per second. The wall flow filter was defined for the simulation purpose as a perforated plate to provide a simplified representation of open cells (e.g., the channels 26) in the wall flow filter and to provide a flow path for the plugging mixture. A moving wall boundary condition was applied to the external surfaces to represent the traverse rate. Under the input data, the contour shows a pressure of approximately 8 pounds per square inch in a space (e.g., the gap 124) between the dispenser and the wall flow filter.

Figure 7:
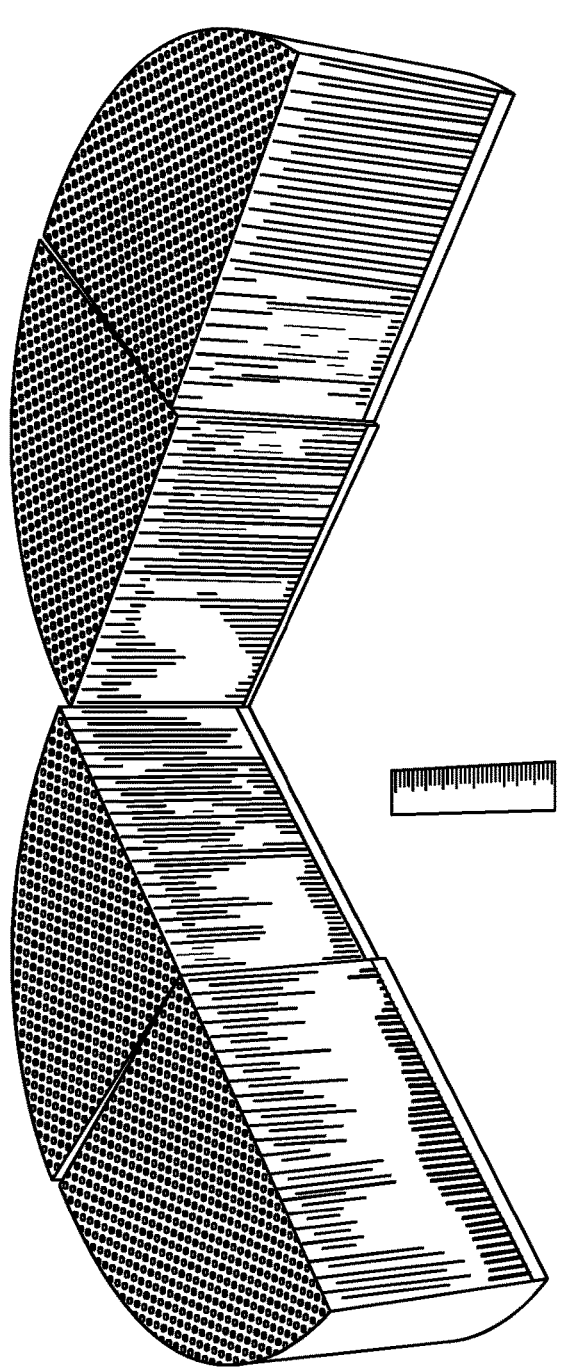
FIG. 7 is a photograph of a sectioned wall flow filter manufactured according to the present disclosure.
Figure 8:
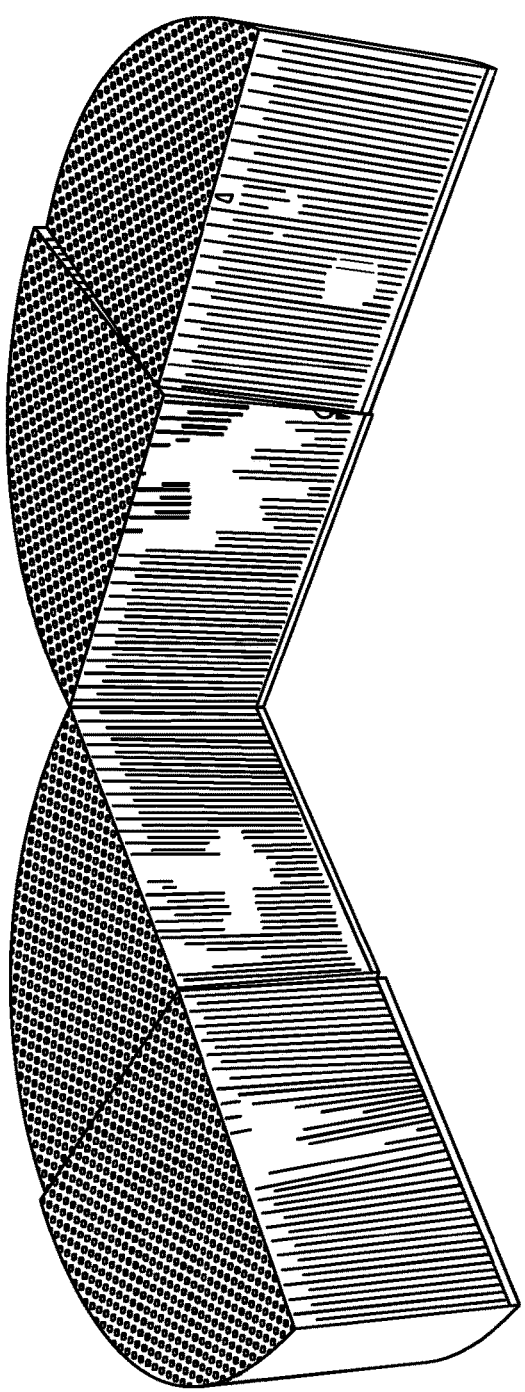
FIG. 8 is a photograph of a sectioned wall flow filter manufactured according to the present disclosure.

Referring now to FIGS. 7 and 8, depicted are exemplary wall flow filters consistent with the honeycomb body 14 of the present disclosure. The plugging mixture was applied to the wall flow filters at an angle of about 6° off vertical. The plugging mixture was applied at a rate of about 180 pounds per hour. A space between the dispenser and the wall flow filter was about 0.02 inches and the dispenser was traversed across the wall flow filter at a rate of about 10 mm per second. FIG. 7 depicts the wall flow filter sectioned in a direction parallel with the traversing direction of the dispenser. FIG. 8 depicts the wall flow filter sectioned in a direction perpendicular to the traversing direction of the dispenser. During and after application of the plugging mixture, there was no visible leakage in the traverse direction at the leading and trailing ends of the dispenser (i.e., suggesting that the filling volume equals supply volume, minus leakage around the wall flow filter). Further, the plugging mixture present in the cells of the wall flow filter has a highly uniform depth within the filter, has high adhesion to the filter, and exhibits little porosity.

Use of the dispenser which is at an angle approximately 6 degrees off vertical results in a converging gap between the external surfaces of the dispenser and the wall flow filter. In combination with the traversing rate of the dispenser, the converging gap increases the shear stress on the plugging mixture thereby enabling higher plugging pressures and reducing leakage of excess plugging mixture. The angular orientation also results in a single edge of the dispenser to be closer to the wall flow filter which provides a smoothing effect on the thin layer of excess plugging mixture.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

What is claimed is:

1. A method of plugging a honeycomb body, comprising the steps of:
    applying a mask layer to the honeycomb body comprising a plurality of channels;
    forming a plurality of holes in the mask layer such that the plurality of holes are aligned with the plurality of channels;
    positioning a nozzle defining an opening proximate the mask layer, the positioning further comprising forming a gap between the nozzle and the mask layer of from about 0.1 mm to about 2 mm;
    moving at least one of the nozzle and the honeycomb body relative to one another; and
    passing a plugging cement through the opening defined by the nozzle against the mask layer such that the plugging cement passes through the plurality of holes in the mask layer and enters the plurality of channels of the honeycomb body.

2. The method of claim 1, wherein the step of moving at least one of the nozzle and the honeycomb body relative to one another further comprises moving the nozzle relative to the honeycomb body.

3. The method of claim 1, wherein the opening of the nozzle is a slot die opening and a length of the slot die opening is greater than a width of the slot die opening.

4. The method of claim 1, wherein the is from about 0.1 mm to about 1 mm.

5. The method of claim 1, wherein the step of positioning the nozzle defining the opening proximate the mask layer further comprises positioning the opening of the nozzle at an angle of from about 0.1° to about 20° relative to the mask layer.

6. The method of claim 1, wherein the step of positioning the nozzle defining the opening proximate the mask layer further comprises positioning the opening of the nozzle at an angle of from about 5° to about 7° relative to the mask layer.

7. A method of plugging a honeycomb body, comprising the steps of:
    applying a mask layer to the honeycomb body comprising a plurality of channels;
    forming a plurality of holes in the mask layer such that the plurality of holes are aligned with the plurality of channels;
    positioning a nozzle defining a slot die opening proximate the mask layer to form a gap between the mask layer and the slot die opening of from about 0.1 mm to about 2 mm;
    moving the honeycomb body relative to the nozzle; and
    passing a plugging cement through the slot die opening defined by the nozzle against the mask layer such that the plugging cement passes through the plurality of holes of the mask layer and enters the plurality of channels of the honeycomb body.

8. The method of claim 7, wherein the opening of the nozzle has a width of from about 1 mm to about 3 mm.

9. The method of claim 7, wherein the step of positioning the nozzle defining the slot die opening proximate the mask layer further comprises positioning the slot die opening of the nozzle beneath the honeycomb body with the mask layer.

10. The method of claim 7, wherein the step of passing the plugging cement through the slot die opening defined by the nozzle against the mask layer further comprises passing the plugging cement at a pressure of from about 3 psi to about 13 psi as measured at the mask layer.

11. The method of claim 7, wherein the step of positioning the nozzle defining the slot die opening further comprises positioning the nozzle defining the slot die opening such that the slot die opening is positioned across a majority of a maximum width of the honeycomb body.

12. The method of claim 7, wherein the step of positioning the nozzle defining the slot die opening proximate the mask layer further comprises positioning the slot die opening of the nozzle at an angle of from about 0° about 20° relative to the mask layer.

13. A method of plugging a honeycomb body, comprising the steps of:
applying a mask layer to the honeycomb body comprising a plurality of channels;
forming a plurality of holes in the mask layer such that the holes are aligned with the plurality of channels;
positioning a nozzle defining a slot die opening proximate the mask layer to form a gap of from about 0.1 mm to about 2 mm between the mask layer and the slot die opening, wherein the nozzle has an angle of from about 0° to about 20° relative to the mask layer and the slot die opening extends across a majority of a maximum width of the mask layer;
moving the honeycomb body relative to the nozzle; and
passing a plugging cement through the slot die opening defined by the nozzle against the mask layer such that the plugging cement passes through the plurality of holes in the mask layer and enters the plurality of channels of the honeycomb body.

14. The method of claim 13, wherein the step of positioning the nozzle defining the slot die opening proximate the mask layer further comprises positioning the slot die opening of the nozzle beneath the honeycomb body with the mask layer.

15. The method of claim 14, wherein the step of passing the plugging cement through the slot die opening defined by the nozzle against the mask layer further comprises passing the plugging cement at a pressure of from about 3 psi to about 13 psi as measured at the mask layer.

16. The method of claim 13, wherein the step of positioning the nozzle defining the slot die opening proximate the mask layer to form the gap of from about 0.1 mm to about 2 mm further comprises forming the gap from about 0.1 mm to about 1 mm.

17. The method of claim 13, wherein the step of positioning the nozzle defining the slot die opening further comprises positioning the nozzle defining the slot die opening across an entirety of the maximum width of the honeycomb body.

18. The method of claim 13, wherein the step of positioning the nozzle defining the slot die opening further comprises positioning the slot die opening of the nozzle at an angle of from about 0° to about 6° relative to the mask layer.

19. The method of claim 1, wherein the step of positioning the nozzle defining the opening proximate the mask layer further comprises positioning the opening of the nozzle at an angle of from about 0.1° to about 1° relative to the mask layer.

20. The method of claim 7, wherein the step of positioning the nozzle defining the slot die opening proximate the mask layer further comprises positioning the slot die opening of the nozzle at an angle of from about 0.1° about 1° relative to the mask layer.

\* \* \* \* \*